US012689086B2

(12) United States Patent
Nemes

(10) Patent No.: US 12,689,086 B2
(45) Date of Patent: Jul. 21, 2026

(54) BATTERY MODULE, BATTERY PACK, ELECTRIC VEHICLE, AND METHOD OF MOUNTING A BATTERY MODULE

(71) Applicant: SAMSUNG SDI CO., LTD., Yongin-si (KR)

(72) Inventor: Marton Nemes, Seiersberg-Pirka (AT)

(73) Assignee: Samsung SDI Co., Ltd., Yongin-si (KR)

( * ) Notice: Subject to any disclaimer, the term of this patent is extended or adjusted under 35 U.S.C. 154(b) by 907 days.

(21) Appl. No.: 17/867,986

(22) Filed: Jul. 19, 2022

(65) Prior Publication Data

US 2023/0028002 A1 Jan. 26, 2023

(30) Foreign Application Priority Data

Jul. 21, 2021 (EP) ..................................... 21186948
Jul. 15, 2022 (KR) ........................ 10-2022-0087764

(51) Int. Cl.
H01M 50/244 (2021.01)
H01M 50/249 (2021.01)
(Continued)

(52) U.S. Cl.
CPC ....... H01M 50/244 (2021.01); H01M 50/249 (2021.01); H01M 50/258 (2021.01);
(Continued)

(58) Field of Classification Search
CPC ............. H01M 50/244; H01M 50/249; H01M 50/543; H01M 50/258; H01M 50/505; H01M 2220/20
See application file for complete search history.

(56) References Cited

U.S. PATENT DOCUMENTS

| | | | |
|---|---|---|---|
| 2014/0045038 A1 | 2/2014 | Kimura et al. | |
| 2020/0203686 A1* | 6/2020 | Park | H01M 10/655 |
| 2022/0045387 A1* | 2/2022 | Taniuchi | H01M 50/55 |

FOREIGN PATENT DOCUMENTS

| | | |
|---|---|---|
| CN | 106601947 A | 4/2017 |
| CN | 206076303 U | 4/2017 |

(Continued)

OTHER PUBLICATIONS

English Machine Translation of Xiao (CN 108666466 A) (Year: 2018).*

(Continued)

*Primary Examiner* — Brian R Ohara
*Assistant Examiner* — Emily Elizabeth Freeman
(74) *Attorney, Agent, or Firm* — Lee IP Law, P.C.

(57) ABSTRACT

A battery module includes secondary battery cells; a one positive current collector structure; and a negative current collector structure; wherein the secondary battery cells include an electrode assembly, a positive terminal electrically, a negative terminal, and a case receiving the electrode assembly, the positive current collector structure interconnects the positive terminals of the secondary battery cells, the negative current collector structure interconnects the negative terminals of the secondary battery cells, the case of each secondary battery cell includes a groove extending around a circumference of the case and forming a part of the negative terminal, and the negative current collector structure includes a flat negative busbar in a plane aligned with the circumference of the case, the flat negative busbar projecting into the groove of the cases to connect the negative current collector structure and the negative terminals of secondary battery cells.

21 Claims, 2 Drawing Sheets

(51) Int. Cl.
    *H01M 50/258*     (2021.01)
    *H01M 50/505*     (2021.01)
    *H01M 50/543*     (2021.01)

(52) U.S. Cl.
    CPC ....... *H01M 50/505* (2021.01); *H01M 50/543*
        (2021.01); *H01M 2220/20* (2013.01)

(56)         References Cited

FOREIGN PATENT DOCUMENTS

| | | | |
|---|---|---|---|
| CN | 206076348 | U | 4/2017 |
| CN | 108666466 | A | 10/2018 |
| EP | 2704230 | A1 | 3/2014 |
| WO | WO 2012/130423 | A1 | 10/2012 |
| WO | WO 2021/074566 | A1 | 4/2021 |

OTHER PUBLICATIONS

European Search Report dated Feb. 1, 2022 for EP 21186948.2.
Chinese Office Action dated Sep. 17, 2025, of the corresponding
Chinese Patent Application No. 202210857692.6.

\* cited by examiner

BATTERY MODULE, BATTERY PACK, ELECTRIC VEHICLE, AND METHOD OF MOUNTING A BATTERY MODULE

CROSS-REFERENCE TO RELATED APPLICATIONS

European Patent Application No. 21186948.2, filed on Jul. 21, 2021, in the European Intellectual Property Office, and entitled: "BATTERY MODULE, A BATTERY PACK, AN ELECTRIC VEHICLE, AND A METHOD OF MOUNTING A BATTERY MODULE," and Korean Patent Application No. 10-2022-0087764 filed in the Korean Intellectual Property Office on Jul. 15, 2022, are incorporated by reference herein in their entirety.

BACKGROUND

1. Field

Embodiments relate to a battery module, a battery pack, an electric vehicle, and a method of mounting the battery module.

2. Description of the Related Art

In the recent years, vehicles for transportation of goods and people have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by, e.g., a gasoline generator. The vehicle may include a combination of electric motor and conventional combustion engine. An electric-vehicle battery (EVB) or traction battery is a battery used to power the propulsion of battery electric vehicles (BEVs). Electric-vehicle batteries may differ from starting, lighting, and ignition batteries, and may be designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries may be used as power supply for small electronic devices, such as cellular phones, notebook computers and camcorders, while high-capacity rechargeable batteries may be used as the power supply for electric and hybrid vehicles and the like.

Rechargeable batteries may include an electrode assembly including a positive electrode, a negative electrode, and a separator between the positive and negative electrodes, a case, e.g., a can, receiving or accommodating the electrode assembly, and an electrode terminal electrically connected to the electrode assembly. An electrolyte solution may be injected into the case in order to facilitate charging and discharging of the battery via an electrochemical reaction of the positive electrode, the negative electrode, and the electrolyte solution. The shape of the case, e.g., cylindrical or rectangular, may depend on the battery's intended purpose. Lithium-ion (and similar lithium polymer) batteries, may be used in laptops or consumer electronics, and may also dominate the most recent group of electric vehicles in development.

Rechargeable batteries may be used as a battery module formed of a plurality of unit battery cells coupled in series or in parallel so as to provide a high energy content, e.g., for motor driving of a hybrid vehicle. The battery module may be formed by interconnecting the electrode terminals of the plurality of unit battery cells depending on a desired amount of power and in order to realize a high-power rechargeable battery.

Battery modules may be constructed either in block design or in modular design. In block designs each battery may be coupled to a common current collector structure and a common battery management system and the unit thereof may be arranged in a housing. In modular designs, battery cells may be connected to form submodules and several submodules may be connected to form the battery module. In automotive applications, battery systems may include a plurality of battery modules connected in series for providing a desired voltage. The battery modules may include submodules with a plurality of stacked battery cells, each stack including cells connected in parallel that are connected in series (XpYs) or cells connected in series that are connected in parallel (XsYp).

A battery pack may be a set of a suitable number of (e.g., identical) battery modules. They may be configured in a series, parallel, or a mixture of both to deliver the desired voltage, capacity, or power density. Components of battery packs may include the individual battery modules, and the interconnects, which provide electrical conductivity between them.

SUMMARY

The embodiments may be realized by providing a battery module, the battery module including a plurality of secondary battery cells; at least one positive current collector structure; and at least one negative current collector structure; wherein each of the secondary battery cells includes an electrode assembly including a positive electrode, a negative electrode, and a separator between the positive electrode and the negative electrode, a positive terminal electrically connected to the positive electrode, a negative terminal electrically connected to the negative electrode, and a case receiving the electrode assembly, the at least one positive current collector structure interconnects the positive terminals of at least two of the plurality of secondary battery cells with each other, the at least one negative current collector structure interconnects the negative terminals of at least two of the plurality of secondary battery cells with each other, the case of each of the plurality of secondary battery cells includes a groove, the groove extending around a circumference of the case and forming at least a part of the negative terminal of each of the plurality of secondary battery cells, and the at least one negative current collector structure includes a flat negative busbar arranged in a plane that is aligned with the circumference of the case of each of at least two of the plurality of secondary battery cells, the flat negative busbar being in the groove of the case of each of the at least two secondary battery cells to connect the at least one negative current collector structure and the negative terminals of the at least two secondary battery cells with each other.

The flat negative busbar may have a thickness in one direction, the groove of each of the plurality of secondary battery cells may have a width in the one direction, and the thickness of the flat negative busbar may be larger than the width of the groove.

The groove of each of the plurality of secondary battery cells may include a base and a lateral surface, the lateral surface may include a protrusion, and the protrusion may be configured to mechanically fasten the flat negative busbar within the groove.

The negative busbar or the groove of each of the plurality of secondary battery cells may deform the negative busbar as a result of insertion of the negative busbar into the groove.

The case of each of the plurality of secondary battery cells may have a cylindrical shape having a major axis, and the groove and the negative terminal of the case may be perpendicular to the major axis.

The at least one negative current collector structure may be made of sheet metal.

The at least one negative current collector structure may include two negative current collector structures, each negative current collector structure including the flat negative busbar such that the battery module includes two flat negative busbars, and the two flat negative busbars may be on opposite lateral surface sections of the cases of the plurality of secondary battery cells.

The plurality of secondary battery cells may be linearly arranged, and each of the two negative current collector structures may extend in parallel to the linearly arranged secondary battery cells.

The groove of each of the plurality of secondary battery cells and each of the two negative current collector structures may be arranged in a same plane in alignment with the circumference of the case of each of the plurality of secondary battery cells.

The at least one negative current collector structure may include two negative current collector structures, each negative current collector structure including the flat negative busbar such that the battery module includes two flat negative busbars, and the plurality of secondary battery cells may be between the two flat negative busbars.

The plurality of secondary battery cells may be linearly arranged, and each of the two negative current collector structures may extend in parallel to the linearly arranged secondary battery cells.

The groove of each of the plurality of secondary battery cells and each of the two negative current collector structures may be arranged in a same plane in alignment with the circumference of the case of each of the plurality of secondary battery cells.

The at least one positive current collector structure and the positive terminals of the at least two of the plurality of secondary battery cells may be mechanically and electrically connected with each other by being pressed onto each other.

The embodiments may be realized by providing a battery pack including a plurality of battery modules according to an embodiment; and interconnects connecting the plurality of battery modules with each other.

The embodiments may be realized by providing an electric vehicle including a battery pack according to an embodiment.

The embodiments may be realized by providing a method of mounting a battery module, the method including providing a plurality of secondary battery cells, at least one positive current collector structure, and at least one negative current collector structure, each of the secondary battery cells including an electrode assembly including a positive electrode, a negative electrode, and a separator between the positive electrode and the negative electrode, a positive terminal electrically connected to the positive electrode, a negative terminal electrically connected to the negative electrode, and a case accommodating the electrode assembly, the at least one positive current collector structure interconnecting the positive terminals of at least two of the plurality of secondary battery cells with each other, and the at least one negative current collector structure interconnecting the negative terminals of at least two of the plurality of secondary battery cells with each other, the case of each of the plurality of secondary battery cells including a groove, the groove extending around a circumference of the case, and the groove forming at least a part of the negative terminal of each of the plurality of secondary battery cells, and the at least one negative current collector structure including a flat negative busbar; arranging the flat negative busbar in a plane that is aligned with the circumference of the case of each of at least two secondary battery cells of the plurality of secondary battery cells; and connecting the negative current collector structure and the negative terminals of the at least two secondary battery cells with each other by arranging the flat negative busbar in the grooves of the cases of each of the at least two secondary battery cells.

Arranging the flat negative busbar in the grooves of the cases of the at least two secondary battery cells may include moving the at least two secondary battery cells and the flat negative busbar relative to each other and in the plane that is aligned with the circumference of the case.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
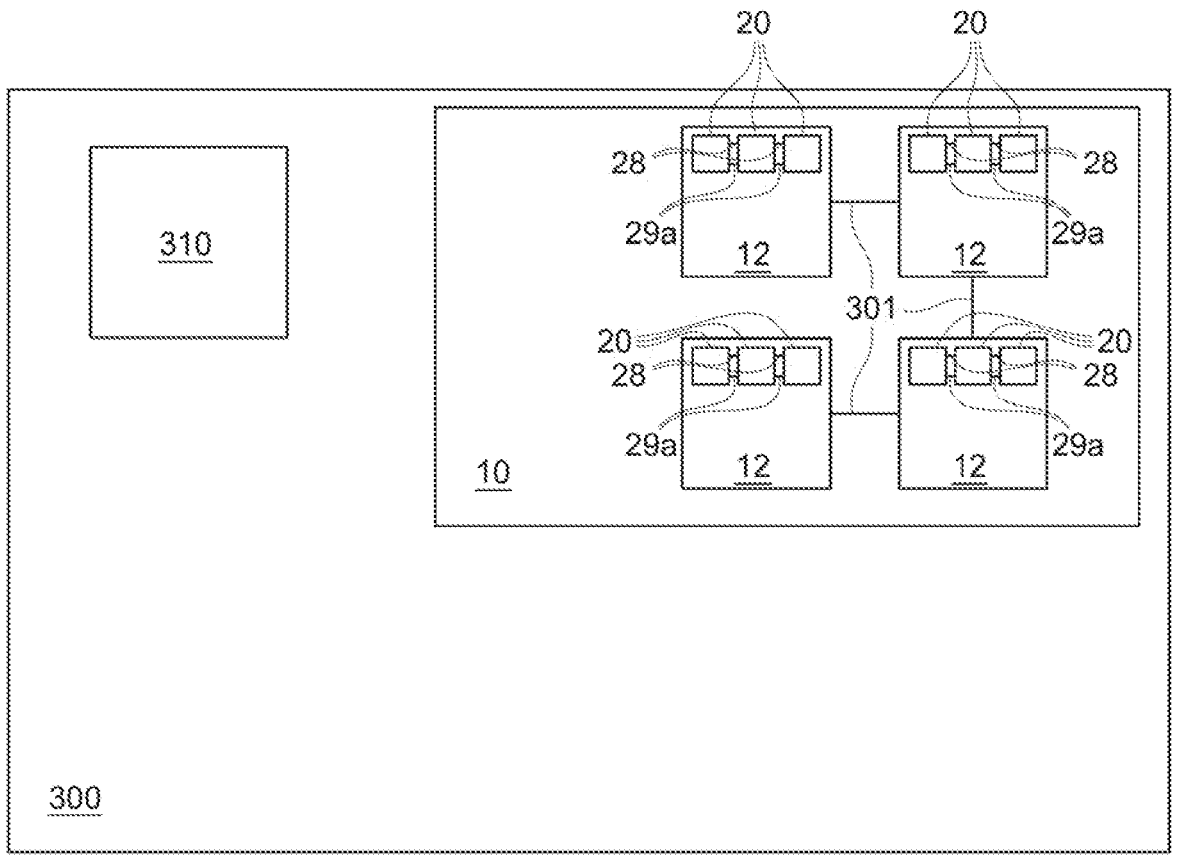
FIG. 1 illustrates a schematic view of an electric vehicle.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic view of an electric vehicle 300. The electric vehicle 300 may be propelled by an electric motor 310, using energy stored in rechargeable batteries arranged in a battery pack 10. The battery pack 10 may include a set of a suitable number of battery modules 12. Rechargeable batteries may be used as a battery module 12 formed of a plurality of secondary battery cells 20. Components of the battery pack 10 may include the individual battery modules 12, and the interconnects 301, which provide electrical conductivity or connections between battery modules 12. In an implementation, e.g., in this schematic representation, each battery module 12 may be coupled to a common positive current collector structure 28 and to a common negative current collector structure 29a, e.g., in each battery pack 10, battery modules 12 may be electrically coupled with each other by a common positive current collector structure 28 and by a common negative current collector structure 29a.

Figure 2:
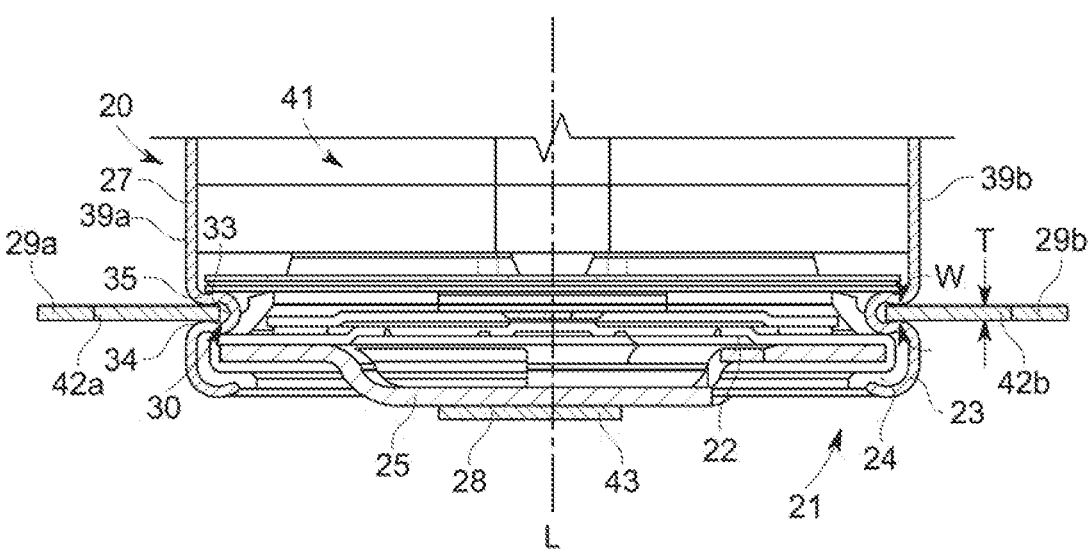
FIG. 2 illustrates a sectional view of a battery module according to an embodiment.

FIG. 2 illustrates a sectional view of a battery module 12 according to an embodiment.

The battery module 12 may include a plurality of secondary battery cells 20, one positive current collector structure 28, and two negative current collector structures 29a, 29b. In this sectional view, only one secondary battery cell 20 is shown.

The secondary battery cell 20 may include an electrode assembly 41 including a positive electrode, a negative electrode, and a separator between the positive electrode and the negative electrode. A negative terminal 23 may be electrically connected to the negative electrode and a cap-up acting as a positive terminal 25 may be electrically connected to the positive electrode. A case 27 may receive or accommodate the electrode assembly 41. The secondary battery cell 20 may further include a cap assembly 21 with a positive temperature coefficient fuse 22. An isolator 24 may be between the negative terminal 23 and the positive terminal 25.

The case 27 may be adapted or configured to form the negative terminal 23, e.g., the case 27 may be made of metal, and the entire case 27 may function as the negative terminal 23.

The case 27 may include a groove 30, e.g., a notch, that is arranged along the circumference of the case 27. In an implementation, the groove 30 may include or be a part of the negative terminal 23, e.g., at least a part of the negative terminal 23 may be arranged in the groove 30 (e.g., an interior of the groove 30 may be conductive to connect the secondary battery cell 20 to an external load). The case 27 may have a cylindrical shape defining an axis L (e.g., may have a major axis L extending lengthwise therethrough at a center thereof) and the groove 30 may be a circular groove (e.g., extending circumferentially around the secondary battery cell 20 equidistant from the axis L). The groove 30 and the negative terminal 23 of the case 27 may be perpendicular to the axis L (e.g., a plane of the groove 30 may be perpendicular to the axis L).

Each of the two negative current collector structures 29a, 29b may interconnect the negative terminals 23 of at least two secondary battery cells 20 with each other. To interconnect the negative terminals 23 of the secondary battery cells 20, each of the two negative current collector structures 29a, 29b may include a negative busbar 42a, 42b. Each of the negative busbars 42a, 42b may project or protrude into the groove 30 of the case 27 of at least two of the secondary battery cells 20 to electrically connect the negative current collector structures 29a, 29b and the negative terminal 23 (see also FIG. 3). A mechanical connection between each of the negative busbars 42a, 42b and the groove 30 may be achieved by pressing the negative busbar 42a, 42b into the groove 30 of the secondary battery cells 20.

The negative busbars 42a, 42b may be flat, e.g., a size of the negative busbars 42a, 42b may be smaller in the direction perpendicular to the plane of the circumference of the secondary battery cells 20 or in the lengthwise direction of the axis L, than in other directions. The negative busbars 42a, 42b may be arranged in a plane that is aligned with the circumference of the case 27 of the secondary battery cells 20. The negative busbars 42a, 42b may be aligned with the grooves 30 of the secondary battery cells 20 to project or protrude into the grooves 30.

The groove 30 of each secondary battery cell 20 may include a base 33 and a lateral surface 34. In an implementation, to help improve the connection between the negative busbars 42a, 42b and the secondary battery cells 20, the lateral surface 34 may include a protrusion 35. In an implementation, the protrusion 35 may help mechanically fasten or hold the negative busbars 42a, 42b within the groove 30. The protrusion 35 may reduce the width W of the groove 30, which may help increase forces that are exerted between the negative busbars 42a, 42b and the lateral surface 34 in the mounted state and during manufacturing of the battery module 12 when the negative busbars 42a, 42b are pressed into the groove 30. The protrusion 35 may be at a lateral surface section of the lateral surface 34 distal to the base 33. In an implementation, with reference to the cylindrical case 27 and its axis L, the protrusion 35 may be arranged radially outwardly so that a cross section of the groove 30 changes non-monotonically from a small cross section near the base 33, to a larger cross section between the base 33 and the protrusion 35, to a smaller cross section at the protrusion 35 to a larger cross section end of the lateral surface 34 distal to the base 33. The two negative busbars 42a, 42b may each have a thickness T. In an implementation, the width W of the groove 30 of each of the plurality of secondary battery cells 20 may be smaller than the thickness T of the negative busbars 42a, 42b such that the negative busbars 42a, 42b may be oversized so that the negative busbars 42a, 42b engage reliable with the groove 30 (e.g., by interference or press-fitting).

The negative busbars 42a, 42b and the groove 30 may be configured to (e.g., plastically) deform the negative busbars 42a, 42b upon insertion of the negative busbars 42a, 42b into the groove 30. In an implementation, the groove 30, e.g., the case 27, may also be deformed upon insertion of each of the negative busbars 42a, 42b into the groove 30. The connection between the negative busbars 42a, 42b and the groove 30 may be achieved by pressing the negative busbars 42a, 42b into the groove 30. In an implementation, the negative busbars 42a, 42b may deform (e.g., plastically) due to forces between the negative busbars 42a, 42b and the lateral surface 34 or the protrusion 35. The connection may reliably (e.g., tightly or irreversibly) connect the negative busbars 42a, 42b and the groove 30.

In an implementation, the negative current collector structure 29a, 29b and the negative busbars 42a, 42b may be made of, e.g., sheet metal.

The two negative current collector structures 29a, 29b and the two negative busbars 42a, 42b may be on opposite lateral surface sections 39a, 39b of the cases 27 of each of the plurality of secondary battery cells 20. In an implementation, one negative busbar 42a may be diametrically oppositely arranged to another negative busbar 42b. As used herein, the term diametrically refers to the diameter of the cylindrical case 27. In an implementation, the opposite lateral surface sections 39a, 39b may be surface sections of the case 27 without any circumferential overlap. The plurality of secondary battery cells 20 may be between the two negative current collector structures 29a, 29b and the two negative busbars 42a, 42b (see also FIG. 3).

The positive current collector structure 28 may interconnect the positive terminals 25 of the secondary battery cells 20 with each other.

Figure 3:
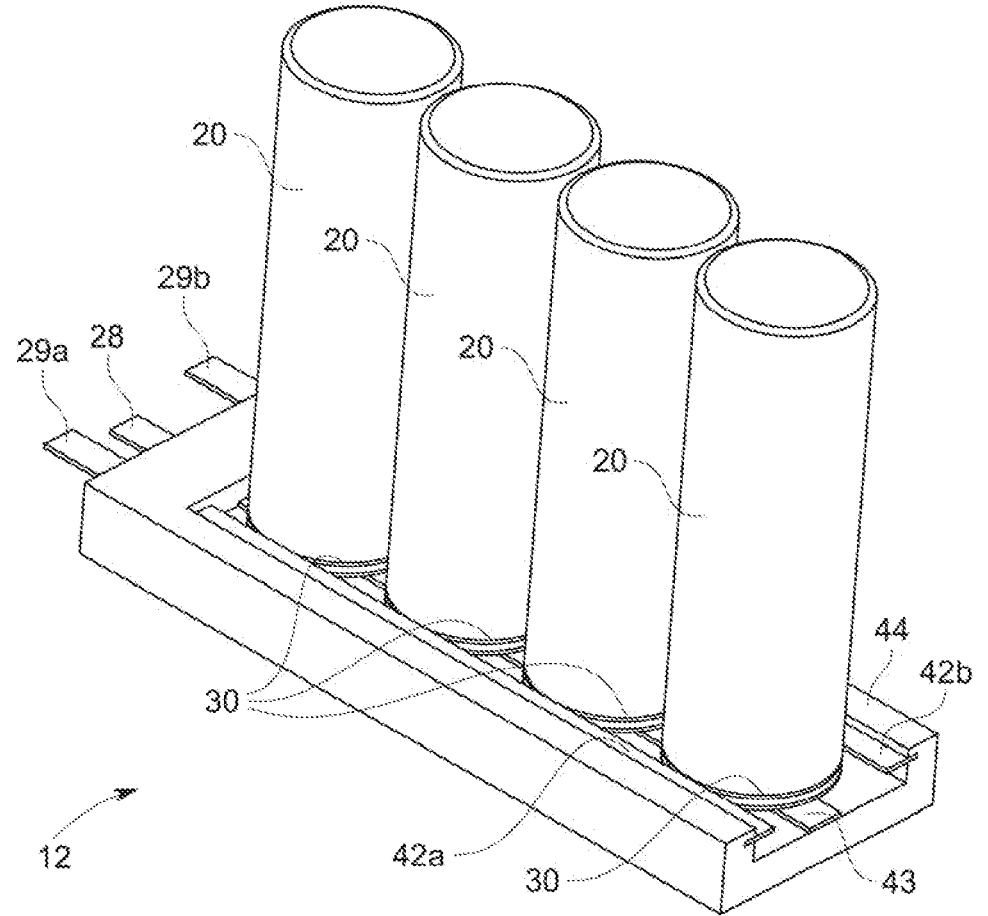
FIG. 3 illustrates a perspective view of an embodiment of a battery module.

FIG. 3 illustrates a perspective view of an embodiment of a battery module 12.

In an implementation, the battery module 12 may include, e.g., four, secondary battery cells 20, each of which may be described with reference to FIG. 2.

To interconnect the positive terminals 25 of the secondary battery cells 20, the positive current collector structure 28 may include a positive busbar 43.

The positive current collector structure 28 with its positive busbar 43, the negative current collector structures 29a, 29b with their negative busbars 42a, 42b, and the secondary battery cells 20 may be retained or held by a retainer 44.

The plurality of secondary battery cells 20 may be linearly arranged (e.g., linearly aligned). In an implementation, each of the two negative current collector structures 29a, 29b and each of the two negative busbars 42a, 42b extend (e.g., lengthwise) in parallel with the linearly arranged secondary battery cells 20.

To interconnect the positive terminals 25 and the positive current collector structure 28, the positive terminal 25 of each of the secondary battery cells 20 may be pressed onto the positive current collector structure 28. This may be achieved by the arrangement of the grooves 30 and the positive terminals 25 of the secondary battery cells 20 relative to the negative busbars 42a, 42b and the positive current collector structure 28. By pressing the negative busbars 42a, 42b into the grooves 30, the positioning of the secondary battery cell 20 may be determined or fixed, e.g., with respect to its axis L. The retainer 44, the negative busbars 42a, 42b, and the positive busbar 43 may be arranged so that, in the mounted state, the positive terminal 25 is pressed onto the positive current collector structure 28 to achieve mechanical and electrical contact between the positive terminal 25 and the positive current collector structure 28. In an implementation, along the axis L of the cases 27 of the secondary battery cells 20, a distance between the negative busbars 42a, 42b and the positive busbar 43 may match a distance between the grooves 30 of the secondary battery cells 20 and the positive terminal 25.

In an implementation, a section of the case 27 may function as the negative terminal 23. In an implementation, the section of the case 27 that includes the groove 30, or a part of the groove 30, e.g., the lateral surface 34 or the base 33, may function as the negative terminal 23. This may help ensure that the negative busbars 42a, 42b may be reliably connected to the negative terminal 23 while the remainder of the case 27 may be electrically isolating or insulating.

By way of summation and review, the mechanical integration of a battery module may use appropriate mechanical connections between the individual components, e.g., of secondary battery cells, and between them and the negative current collector structure. These connections should remain functional and safe during the average service life of the battery system. Further, installation space requirements may be met, especially in mobile applications. The electrical connections between individual components of the battery modules, e.g., of secondary battery cells, and between them and the negative current collector structure, may be made with a view toward reliability, low transition resistance, and cost-effective mountability.

In some battery modules, the connection between the negative current collector structure and the cell may be realized by, e.g., screwing, welding, or bonding, in order to achieve a durable low resistance connection that is also suitable for high volume production processes. The manufacture of such connections may be made by suitable methods, especially for cell types with two dedicated separate cell poles, e.g., prismatic type cells or pouch type cells. For cylindrical cells, in which one pole is formed by the circular shaped cell can, these connections may not be suitable because the contact area is curved and the cell may require an accurate positioning or orientation for being mounted in a battery module. Furthermore, in the case of screwing, the arrangement of screws may require extra installation space.

One type of battery module may include a positive electrode bus structure with a positive electrode contact piece, a negative bus plate and an insulation reinforcement plate there between. The negative bus plate may include negative electrode through holes provided with a battery clamping structure including a plurality of elastic claws each. Cylindrical battery cells connected by the positive electrode bus structure and the negative bus plate may include a concave ring groove into which the plurality of elastic claws is clamped. The battery clamping structure may be clamped on the ring groove of the negative electrode of each cylindrical battery cell to attach the cell. The elastic claws of the negative bus plate may extend towards the positive electrode bus structure.

In some battery modules, electrical connections between the negative bus plate and the cells may be realized by the elastic claws that extend towards the positive electrode bus structure. Thus, the manufacture of the negative bus plate and the arrangement of the clamps thereon may be highly specific with respect to the arrangement of cells which makes the manufacture of the negative bus plate complex as, e.g., sheet metal may need to be stamped precisely to achieve an accurate arrangement of cells and an accurate orientation of the elastic claws. Furthermore, the elasticity of the elastic claws could decrease in the course of time due to thermal, chemical, or mechanical influences. A decrease of elasticity could lead to a decreasing electrical or mechanical connection between the cell and the negative bus plate.

According to an embodiment, the negative busbar and the grooves of at least two secondary battery cells may be aligned in the same plane so that the negative busbar may easily project or be inserted into the grooves to establish a mechanical and electrical connection between the negative current collector structure and the secondary battery cells. The grooves may function as slots in which the at least one negative busbar is inserted to achieve a reliable mechanical and electrical connection. This avoids bonding, welding, or screwing to interconnect the negative current collector structure and the secondary battery cells and thereby facilitates the manufacture of the battery module. The negative busbar may be flat, e.g., the negative current collector structure may include a planar portion that forms the negative busbar, and the size of the negative busbar may be smaller in the direction perpendicular to the plane of the circumference of the at least two secondary battery cells than in the other directions. That the at least one negative current collector structure includes at least one flat negative busbar arranged in a plane that is aligned with the circumference of the case of each of the at least two of the plurality of secondary battery cells also implies that at least one flat negative busbar may be arranged in a plane that is aligned with the groove of the case of each of the at least two of the plurality of secondary battery cells. This facilitates the manufacture of the battery module as the negative busbar may easily project or be inserted into the grooves of the secondary battery cells. The projection of the negative busbar into the grooves of the secondary battery cells may help improve the mechanical integration of the secondary battery cells within the battery module by mounting the secondary battery cells at their grooves to the negative busbar. By directly contacting the negative current collector structure via the negative busbar with the negative terminal that is formed by the groove, a low electrical transition resistance may be achieved.

According to an embodiment, due to the alignment of the negative busbar with the circumference of at least two of the plurality of secondary battery cells, the manufacture of the battery module may be improved by avoiding the manufacture of elastic claws that extend out of the plane that is aligned with the circumference of at least two of the plurality of secondary battery cells. The negative busbar according to an embodiment may not use elastic elements and thereby may help improve the reliability of the connection between the negative current collector structure and the secondary battery cells.

The battery modules according to an embodiment may have reliable mechanical and electrical connections, and may be mounted effectively, and the improved connection between the cell and the one or more current collector structures may help improve the reliability of mechanical and electrical connections of the battery pack and of the efficiency of mounting the battery pack.

The battery modules according to an embodiment may have reliable mechanical and electrical connections, and may be mounted effectively, and the improved connection between the cell and the one or more current collector structures may help improve the reliability of mechanical and electrical connections of the electric vehicle and of the efficiency of mounting in the electric vehicle.

According to an embodiment, at least two of the plurality of secondary battery cells may be arranged so that the planes in which their respective circumferences and thereby their grooves are arranged coincide. In this plane, the at least one negative busbar may be aligned to facilitate the manufacture of the battery module.

According to an embodiment, the at least one negative busbar may have a thickness, and the groove of each of the plurality of secondary battery cells may have a width, and the thickness of the at least one negative busbar may be larger than the width of the groove such that the negative busbar may be oversized compared to the groove. The negative busbar may be pressed into the groove to achieve a particularly reliable mechanical and electrical connection between the negative busbar and the secondary battery cells. The thickness of the negative busbar may be a measure for the size of the negative busbar in a direction perpendicular to the plane in which the negative busbar is arranged, e.g., perpendicular to the circumference or the groove of the at least two secondary battery cells. The width of the groove may be the size of the groove perpendicular to the circumference of the at least two secondary battery cells.

In an implementation, the groove of each of the plurality of secondary battery cells may include a base and a lateral surface, the lateral surface may include a protrusion thereon, and the protrusion may help mechanically fasten the negative busbar within the groove to help further improve the mechanical connection between the negative busbar and the secondary battery cells. In this embodiment, the protrusion, e.g., a shoulder, may decrease the width of the groove which may, in the mounted state, help improve or increase forces exerted between the lateral surface of the groove and the negative busbar.

In an implementation, the negative busbar or the groove of each of the plurality of secondary battery cells may be adapted or configured to (e.g., plastically) deform the negative busbar upon insertion of the negative busbar into the groove. The deformation of the negative busbar, and alternatively or additionally of the groove, may facilitate a reliable connection that is based on adhesion of surfaces or surface sections of the negative busbars and of the groove. This leads to a reliable mechanical contact and excellent electrical contact with low contact resistance. The deformation may provide a very strong or irreversible connection, e.g., due to the plastic deformation of the negative busbar or the groove, e.g., the case, and the connection may not be released without leaving the negative busbar in a state in which the connection cannot be realized afterwards (e.g., may not be reconnected).

In an implementation, the case of each of the plurality of secondary battery cells may have a cylindrical shape having a major axis, and the groove and the negative terminal of the case may be arranged along or around the circumference of the case. In this embodiment, the case may have the major axis defined by the cylindrical shape and a circumference in a plane orthogonal the axis and along the surface of the case. In an implementation, the groove may be a circular groove. The circumferential arrangement of the groove and of the negative terminal may guarantee or facilitate that the cells may be mounted in any orientation with respect to rotation around the major axis of the case of each of the cells, which may lead to an effective and reliable mounting of cells without the need to orient cells around their major axes. This may simplify the method of mounting such a battery module by lowering a number of method steps and reducing the complexity of the method by avoiding the orientation of the cells around their major axes.

In an implementation, the at least one negative current collector structure may be made of sheet metal to provide a cost-effective element that provides an appropriate stiffness to form the negative busbars and to mechanically connect the negative current collector structure with the secondary battery cells.

In an implementation, the battery module may include two negative current collector structures each including a negative busbar, wherein the two negative current collector structures or the two negative busbars are arranged on opposite lateral surface sections of the case of each of the plurality of secondary battery cells to facilitate an efficient assembly of the battery module and achieve an improved mechanical integration of the battery cells within the battery module.

In an implementation, the battery module may include two negative current collector structures each including a negative busbar, and the plurality of secondary battery cells may be arranged between the two negative current collector structures or between the two negative busbars to facilitate an efficient assembly of the battery module and achieve an improved mechanical integration of the battery cells within the battery module.

In an implementation, the plurality of secondary battery cells may be linearly arranged, and each of the two negative current collector structures or each of the negative busbars may extend in parallel to the linearly arranged secondary battery cells to help further improve the mechanical integration of the battery cells within the battery module. This embodiment may be particularly space-saving and may lead to a compact battery module.

In an implementation, the groove of each of the plurality of secondary battery cells and each of the negative current collector structures or each of the negative busbars may be arranged in or on the same plane in alignment with the circumference of the case of each of the plurality of secondary battery cells. In this embodiment, each groove and each negative current collector structure or each of the negative busbar may be aligned with each other. This may lead to a space-saving battery module and to an improved mountability.

In an implementation, the at least one positive current collector structure and the positive terminals of the at least two of the plurality of secondary battery cells may be mechanically and electrically connected with each other by being pressed onto each other. In this embodiment, the at least one negative busbar and the groove of each of the at least two of the plurality of secondary battery cells may be arranged to position, in the mounted state, the battery cells so that the positive terminals are pressed onto the at least one positive current collector structure, e.g., the distance between the positive terminal and the groove may coincide with the distance between the negative busbar and the positive current collector structure.

In an implementation, in the method of mounting a battery module, arranging the at least one flat negative busbar to be inserted into the groove of the case of the at least two secondary battery cells may be performed by moving the at least two secondary battery cells and the at least one flat negative busbar relative to each other and in the plane that is aligned with the circumference of the case. In an implementation, the battery module may be mounted by shifting the battery cells along the negative busbar. The negative busbar may function as a guide for the secondary battery cells that are to be shifted or slid along the negative busbar by engaging with the respective grooves of the cells.

One or more embodiments may provide an alternative battery module that may be effectively and cost-effectively manufactured without the need for screwing, bonding, Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of secondary battery cells;
at least one positive current collector structure;
at least one negative current collector structure; and
a retainer for holding the plurality of secondary battery cells, the at least one positive current collector structure, and the at least one negative current collector,
wherein:
each of the secondary battery cells includes:
an electrode assembly including a positive electrode, a negative electrode, and a separator between the positive electrode and the negative electrode,
a positive terminal electrically connected to the positive electrode,
a negative terminal electrically connected to the negative electrode, and
a case receiving the electrode assembly,
the at least one positive current collector structure interconnects the positive terminals of at least two of the plurality of secondary battery cells with each other,
the at least one negative current collector structure interconnects the negative terminals of at least two of the plurality of secondary battery cells with each other,
the case of each of the plurality of secondary battery cells includes a groove, the groove extending around a circumference of the case and forming at least a part of the negative terminal of each of the plurality of secondary battery cells, and
the at least one negative current collector structure includes a flat negative busbar arranged in a plane that is aligned with the circumference of the case of each of at least two of the plurality of secondary battery cells, the flat negative busbar being flat, and an edge of the flat negative busbar being in the groove of the case of each of the at least two secondary battery cells to connect the at least one negative current collector structure and the negative terminals of the at least two secondary battery cells with each other.

2. The battery module as claimed in claim 1, wherein:
the flat negative busbar has a thickness in one direction,
the groove of each of the plurality of secondary battery cells has a width in the one direction, and
the thickness of the flat negative busbar is larger than the width of the groove.

3. The battery module as claimed in claim 1, wherein:
the groove of each of the plurality of secondary battery cells includes a base and a lateral surface,
the lateral surface includes a protrusion, the protrusion protruding into the groove and decreasing a width of the groove, and
the protrusion is configured to mechanically fasten the flat negative busbar within the groove.

4. The battery module as claimed in claim 1, wherein the negative busbar or the groove of each of the plurality of secondary battery cells deforms the negative busbar as a result of insertion of the negative busbar into the groove.

5. The battery module as claimed in claim 1, wherein:
the case of each of the plurality of secondary battery cells has a cylindrical shape having a major axis, and
the groove and the negative terminal of the case are perpendicular to the major axis.

6. The battery module as claimed in claim 1, wherein the at least one negative current collector structure is made of sheet metal.

7. The battery module as claimed in claim 1, wherein:
the at least one negative current collector structure includes two negative current collector structures completely separated and spaced apart from each other, each negative current collector structure including the flat negative busbar such that the battery module includes two flat negative busbars, and
the two flat negative busbars are on opposite lateral surface sections of the cases of the plurality of secondary battery cells.

8. The battery module as claimed in claim 7, wherein:
the plurality of secondary battery cells is linearly arranged, and
each of the two negative current collector structures extend in parallel to the linearly arranged secondary battery cells.

9. The battery module as claimed in claim 7, wherein the groove of each of the plurality of secondary battery cells and each of the two negative current collector structures are arranged in a same plane in alignment with the circumference of the case of each of the plurality of secondary battery cells.

10. The battery module as claimed in claim 1, wherein:
the at least one negative current collector structure includes two negative current collector structures, each negative current collector structure including the flat negative busbar such that the battery module includes two flat negative busbars, and the plurality of secondary battery cells is between the two flat negative busbars.

11. The battery module as claimed in claim 10, wherein:
the plurality of secondary battery cells is linearly arranged, and
each of the two negative current collector structures extend in parallel to the linearly arranged secondary battery cells.

12. The battery module as claimed in claim 10, wherein the groove of each of the plurality of secondary battery cells and each of the two negative current collector structures are arranged in a same plane in alignment with the circumference of the case of each of the plurality of secondary battery cells.

13. The battery module as claimed in claim 1, wherein the at least one positive current collector structure and the positive terminals of the at least two of the plurality of secondary battery cells are mechanically and electrically connected with each other by being pressed onto each other.

14. A battery pack, comprising:
a plurality of battery modules as claimed in claim 1; and
interconnects connecting the plurality of battery modules with each other.

15. An electric vehicle comprising a battery pack as claimed in claim 14.

16. A method of mounting a battery module, the method comprising:
providing a plurality of secondary battery cells, at least one positive current collector structure, and at least one negative current collector structure;
providing a retainer for holding the plurality of secondary battery cells, the at least one positive current collector structure, and the at least one negative current collector,
wherein each of the secondary battery cells includes:
an electrode assembly including a positive electrode, a negative electrode, and a separator between the positive electrode and the negative electrode,
a positive terminal electrically connected to the positive electrode,
a negative terminal electrically connected to the negative electrode, and
a case accommodating the electrode assembly, the at least one positive current collector structure interconnecting the positive terminals of at least two of the plurality of secondary battery cells with each other, and the at least one negative current collector structure interconnecting the negative terminals of at least two of the plurality of secondary battery cells with each other, the case of each of the plurality of secondary battery cells including a groove, the groove extending around a circumference of the case, and the groove forming at least a part of the negative terminal of each of the plurality of secondary battery cells, and the at least one negative current collector structure including a flat negative busbar that is flat;
arranging the flat negative busbar in a plane that is aligned with the circumference of the case of each of at least two secondary battery cells of the plurality of secondary battery cells; and
connecting the negative current collector structure and the negative terminals of the at least two secondary battery cells with each other by arranging an edge of the flat negative busbar in the grooves of the cases of each of the at least two secondary battery cells.

17. The method of mounting a battery module as claimed in claim 16, wherein arranging the flat negative busbar in the grooves of the cases of the at least two secondary battery cells includes moving the at least two secondary battery cells and the flat negative busbar relative to each other and in the plane that is aligned with the circumference of the case.

18. The battery module as claimed in claim 1, wherein the entirety of the flat negative busbar, including the edge, and the groove of the case are aligned in a same plane.

19. The battery module as claimed in claim 1, wherein the edge of the flat negative busbar has a linear shape, the linear shape extending continuously between the at least two secondary battery cells and directly contacting the at least two secondary battery cells through the groove.

20. The battery module as claimed in claim 1, wherein a single continuous portion of the edge of the flat negative busbar is in direct contact with the groove of each of the at least two secondary battery cells.

21. A battery module, comprising:
a plurality of secondary battery cells;
at least one positive current collector structure;
at least one negative current collector structure; and
a retainer for holding the plurality of secondary battery cells, the at least one positive current collector structure, and the at least one negative current collector,
wherein:
each of the secondary battery cells includes:
an electrode assembly including a positive electrode, a negative electrode, and a separator between the positive electrode and the negative electrode,
a positive terminal electrically connected to the positive electrode,
a negative terminal electrically connected to the negative electrode, and
a case receiving the electrode assembly,
the at least one positive current collector structure interconnects the positive terminals of at least two of the plurality of secondary battery cells with each other,
the at least one negative current collector structure interconnects the negative terminals of at least two of the plurality of secondary battery cells with each other,
the case of each of the plurality of secondary battery cells includes a groove, the groove extending around a circumference of the case and forming at least a part of the negative terminal of each of the plurality of secondary battery cells,
the at least one negative current collector structure includes a flat negative busbar arranged in a plane that is aligned with the circumference of the case of each of at least two of the plurality of secondary battery cells, the flat negative busbar being flat, and an inner edge of the flat negative busbar being in the groove of the case of each of the at least two secondary battery cells to connect the at least one negative current collector structure and the negative terminals of the at least two secondary battery cells with each other, and
the inner edge of the flat negative busbar has a linear shape, the linear shape extending continuously between the at least two secondary battery cells and contacting the at least two secondary battery cells through the groove.

* * * * *